United States Patent [19]

Sasa et al.

[11] Patent Number: 5,263,879
[45] Date of Patent: Nov. 23, 1993

[54] AUTOMOTIVE CIGAR LIGHTER PLUG

[75] Inventors: Motokazu Sasa; Masakatsu Shimada, both of Tokyo, Japan

[73] Assignee: SMK Corporation, Tokyo, Japan

[21] Appl. No.: 1,581

[22] Filed: Jan. 6, 1993

[30] Foreign Application Priority Data

Feb. 25, 1992 [JP] Japan .............................. 4-017339[U]

[51] Int. Cl.⁵ .............................................. H01R 11/00
[52] U.S. Cl. ................................................... 439/668
[58] Field of Search ................................ 439/668, 669

[56] References Cited

U.S. PATENT DOCUMENTS 5,158,484 10/1992 Chou ................................... 439/668
5,201,677  4/1993 Takayama ........................... 439/668

FOREIGN PATENT DOCUMENTS 446387 10/1992 Japan .

Primary Examiner—Joseph H. McGlynn
Attorney, Agent, or Firm—Thomas R. Morrison

[57] ABSTRACT

A cigar lighter plug includes a slider therein slidable between first and second positions. At a first position of the slider, a contact spring is urged outward to a first radial position suitable for fitting the plug into a small size cigar lighter socket. At a second position of the slider, the contact spring is urged outward to a second radial position suitable for fitting the plug into a large size cigar lighter socket. In one embodiment, cooperation between a boss and depressions produces a click feel and sound to inform the user that an adjustment operation is completed. In another embodiment, a retention spring, generally similar to the contact spring, is moved to first and second radial positions during adjustment of the radial position of the contact spring.

9 Claims, 7 Drawing Sheets

AUTOMOTIVE CIGAR LIGHTER PLUG

BACKGROUND OF THE INVENTION

This invention relates to electrical connecting devices and, more particularly, to electrical connectors which are inserted into cigar lighter sockets in automobiles.

Generally, a cigar lighter plug is inserted into a cigar lighter socket mounted in a motor vehicle (hereinafter called "Socket") wherein the plug permits tapping off electrical power from the electrical terminals in the Socket in order to supply electrical power to accessories in the motor vehicle, such as lighting devices, calculators, shavers and the like.

Such plugs are in various forms such as shown, for example, in U.S. Pat. No. 4,322,122 and U.S. Pat. No. 4,988,315. The plugs in these patents are adapted to fit into a single diameter socket. Different countries have adopted different standardized socket sizes for cars manufactured therein. Therefore, cigar lighter plugs (hereinafter called "Plug") must be designed to fit the Sockets in which they are to be inserted.

Sockets in European cars are larger in diameter than those in U.S. and Japanese cars. If one attempts to insert a large size Plug adapted for European cars into a small size Socket of a U.S. or Japanese car, an arcuate spring contact projecting from the periphery of the Plug body is deformed. If a plug with spring contacts thus deformed is inserted into a large diameter Socket, the poor mechanical fit results in high electrical contact resistance. If a small size Plug is inserted into a large size Socket, inadequate retention is produced, and high electrical contact resistance results.

For the above reasons, Plugs designed for some countries, cannot be used Sockets in from another country. Thus, in view of the foregoing, a need exists for a universal cigar lighter plug which can be used in vehicles from any country in the world.

Japanese Utility Model Examined Publication 4-46387, laid open Nov. 22, 1989, discloses a cigar lighter plug having an arcuate leaf spring held on the plug by a bolt. After loosening the bolt, the leaf spring can be rotated into one of two positions. Once the leaf spring is in the selected position, the bolt is tightened to retain the leaf spring in that position. In one position, the leaf spring extends into the cigar lighter socket, thereby increasing the effective diameter of the plug for fitting a large size socket. In the second position, the leaf spring is rotated to face outward from the contact end, whereby the leaf spring remains outside the socket, thereby permitting fitting the plug into a small size socket. It is considered inconvenient for a user to find tools, loosen a bolt, rotate the leaf spring and then tighten the bolt to adapt the cigar lighter plug to small and large size sockets. If an attempt is made to insert such a plug, adjusted to fit a large size socket, into a small size socket, the leaf spring is deformed or damaged in the same manner as is the contact of the large size plug forced into a small size socket. The inconvenience and difficulty of performing the adjustment of the leaf spring (finding tools, and loosening a bolt which may be frozen in place from use) makes it unlikely that a plug, adjusted to fit a large size socket, will be readjusted to fit it into a small size socket.

The above problem is far from trivial since such a cigar lighter plug is generally used to power portable equipment which is generally designed to be carried from vehicle to vehicle. Thus, adjustment on a daily basis, perhaps oftener, may be required.

OBJECTS AND SUMMARY OF THE INVENTION

It is an object of the invention to provide a cigar lighter plug which overcomes the drawbacks of the prior art.

It is a further object of the invention to provide a cigar lighter plug which permits adaptation to at least two cigar lighter sockets.

It is a still further object of the invention to provide a cigar lighter plug which includes means for adjusting a radial position of a spring contact, thereby permitting a single cigar lighter plug to fit a plurality of cigar lighter sockets.

It is still further object of the invention to provide a cigar lighter plug having first and second radial positions of its spring contact and a stopper, operable in one of the positions, for limiting an insertion distance of the plug into the socket.

It is further object of the present invention to provide a Plug useable in any country of the world by permitting adjustment of the protrusion of its contacts.

It is another object of the present invention to attain a reliable electrical connection between a Plug and a cooperating Socket.

The Plug body has at least one grounding contact in the form of an arcuately shaped spring contact around its periphery. The distance that the spring contact protrudes is adjusted according to the diameter of the Socket to ensure sufficient mechanical retentive power and low electrical contact resistance. The ends of the contact are fixed to the inside of the Plug and a springy portion protrudes through openings in the Plug periphery. At least one slider for adjusting the protrusion length is mounted under the grounding contact in such a way that it can slide smoothly along the grounding contact. Each slider is connected to an adjustment knob that can slide along a window in the side of the Plug body. The Plug has a large size position and a small size positions which are selected by the adjustment knob. When the large size position is selected by the adjustment knob, the slider slides under the grounding contact, so that it lifts the grounding contact to increase the protrusion of the contact.

Thus, the Plug can be adjusted to have sufficient retentive power for large diameter Sockets in European-made cars by decreasing the distance between the outer surface of the contact of the Plug and the inner surface of the Socket.

For small diameter Sockets, the adjustment knob slides to the small position to decrease the protrusion of the contact.

Briefly stated, the present invention provides a cigar lighter plug which includes a slider therein slidable between first and second positions. At a first position of the slider, a contact spring is urged outward to a first radial position suitable for fitting the plug into a small size cigar lighter socket. At a second position of the slider, the contact spring is urged outward to a second radial position suitable for fitting the plug into a large size cigar lighter socket. In one embodiment, cooperation between a boss and depressions produces a click feel and sound to inform the user that an adjustment operation is completed. In another embodiment, a retention spring, generally similar to the contact spring, is moved to first and second radial positions during adjustment of the radial position of the contact spring.

According to an embodiment of the invention, there is provided a cigar lighter plug for insertion into a socket comprising: a contact extending a predetermined distance radially from the cigar lighter plug for contacting an interior of the socket, means for adjusting the predetermined distance to at least first and second different values, the socket having at least first and second different interior diameters, the first diameter being smaller than the second diameter, the first value being adapted for contacting the first interior diameter, and the second value being adapted for contacting the second interior diameter.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 10b is a bottom view of the spring of FIG. 10a.

FIG. 11b is a bottom view of the spring of FIG. 11a.

DETAILED DESCRIPTION OF THE PREFERRED EMBODIMENT

Figure 1:
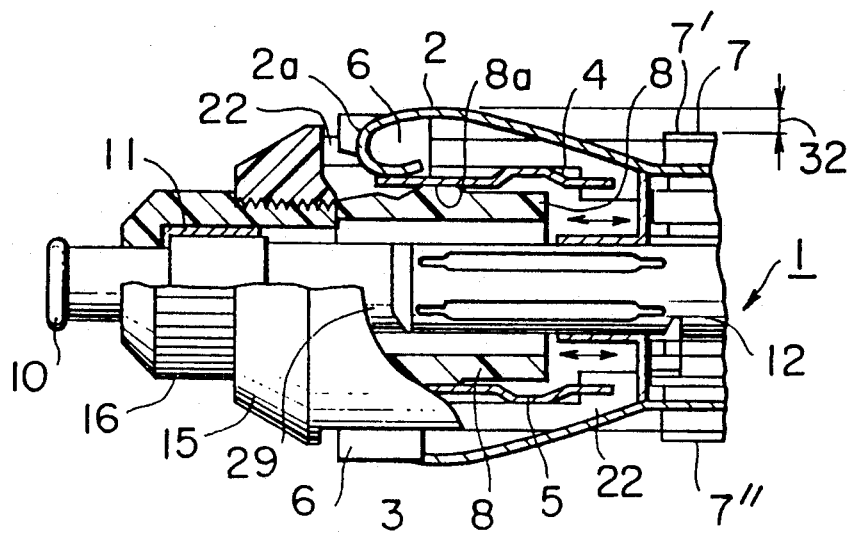
FIG. 1 is a perpendicular partial sectional view of a Plug according to an embodiment of the invention adjusted to its large size position.

Referring to FIGS. 1 a Plug 1 has a generally cylindrical body 7 adapted for inserted into a cigar lighter socket 20 in a motor vehicle. The Plug 1 is formed from a pair of molded half shell portions consisting of a male half shell portion 7' and a female half shell portion 7". The two half shell portions are joined together to form the generally cylindrical body 7 by a screw and cooperating nut 18. A positive contact element 10 extends from the body 7 and contacts the electrode on the Socket 20. A grounding contact 2, in the form of an arcuately bowed spring, has a springy end 2a protruding beyond the periphery of the Plug body 7 through an opening 22 in the one side between the male half shell portion 7' and female half shell portion 7". A similar arcuately bowed retention spring 3 protrudes through an opening 22' from the opposite side of the body 7. In the preferred embodiment illustrated, retention spring 3 is used only for retention, and is not used as a grounding contact. An embodiment in which retention spring 3 may also be part of the electrical connection is considered to be within the scope of the invention.

A front end of a cartridge fuse 29 is clamped in a connection member 11 at the rear end of the positive contact element 10. The rear end of cartridge fuse 29 is fitted into a fuse holder 12. A conventional spring (not shown) in fuse holder 12 biases cartridge fuse 29 resiliently in the forward direction toward the connection member 11. This resilient bias of fuse holder 12 provides resilient urging of the positive contact element in the forward direction to provide positive contact with the contacting surface in socket 20. The fuse holder 12 has a fuse terminal 13 at its rear end. A protrusion-adjusting slider 8 is movable smoothly along the periphery of the fuse holder 12. The slider 8 includes a first arm slidable along the internal surface of the grounding contact 2 and a second arm slidable along the internal surface of the retention spring 3.

One conductor of a two-conductor electric cord (not shown in the figure) may be connected to the fuse terminal 13. The other conductor may be connected to a terminal 17 (FIG. 2) at the rear end of the grounding contact 2. The other end of the electric cord passes through an opening 7a at the rear end of the Plug body 7 for feeding power to a using element.

Figure 3A:
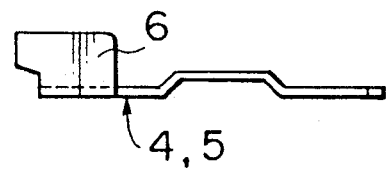
FIG. 3a is a front view of the sliding spring plate of the embodiment of the invention in FIG. 1.
Figure 3B:
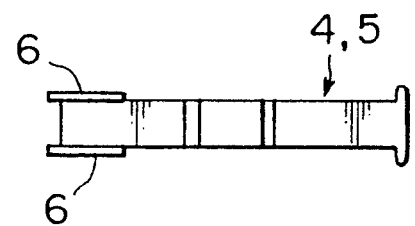
FIG. 3b is a plan view of the sliding spring plate of the embodiment of FIG. 1.

Referring now also to FIGS. 3a and 3b, a first sliding spring plate 4, is mounted between the grounding contact 2 and the slider 8. A second sliding spring plate 5 is disposed between the retention spring 3 and the slider 8. Sliding spring plates 4, 5 are each fixed to the inside of the body 7 so as to be able to pivot about its rear end. A stopper 6 is mounted on the tip of the sliding spring plates 4 and 5. Stopper 6 is bent upward at both sides of the tips of spring plates 4 and 5.

Figure 4A:
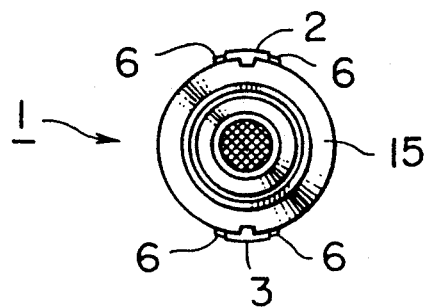
FIG. 4a is a front view of the Plug of FIG. 2.
Figure 4B:
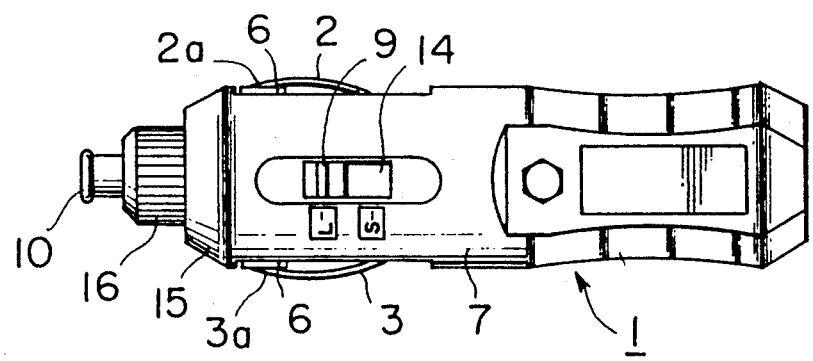
FIG. 4b is a first side view of the plug of FIG. 2.
Figure 4C:
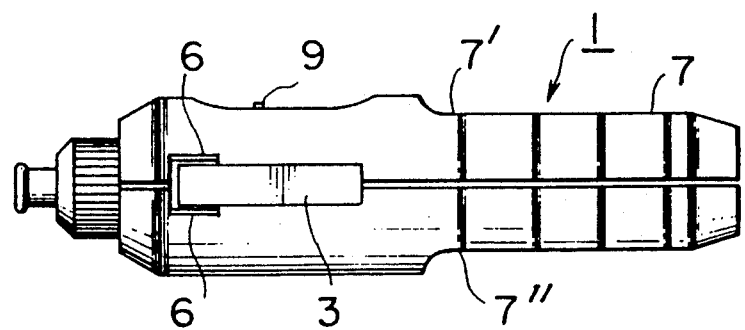
FIG. 4c is a second side view of the plug of FIG. 2.

Referring now to FIGS. 4b and 4c, an adjustment knob 9 integrally formed with the slider 8, protrudes through an elongated window 14 in the side of the Plug body 7. The adjustment knob 9 slides along the window 14 between a "large size position" and a "small size position".

At a tip 15 of the Plug body 7, a cap 16 covers the positive contact element 10 and the connection member 11. The cap 16 may be affixed to the body 7 using any convenient means, but is preferably affixed by cooperating threads on an inner surface of the tip 15 and an outer surface of the cap 16. Such threaded attachment makes is easy to remove cap 16 for replacement of fuse 13.

Figure 2:
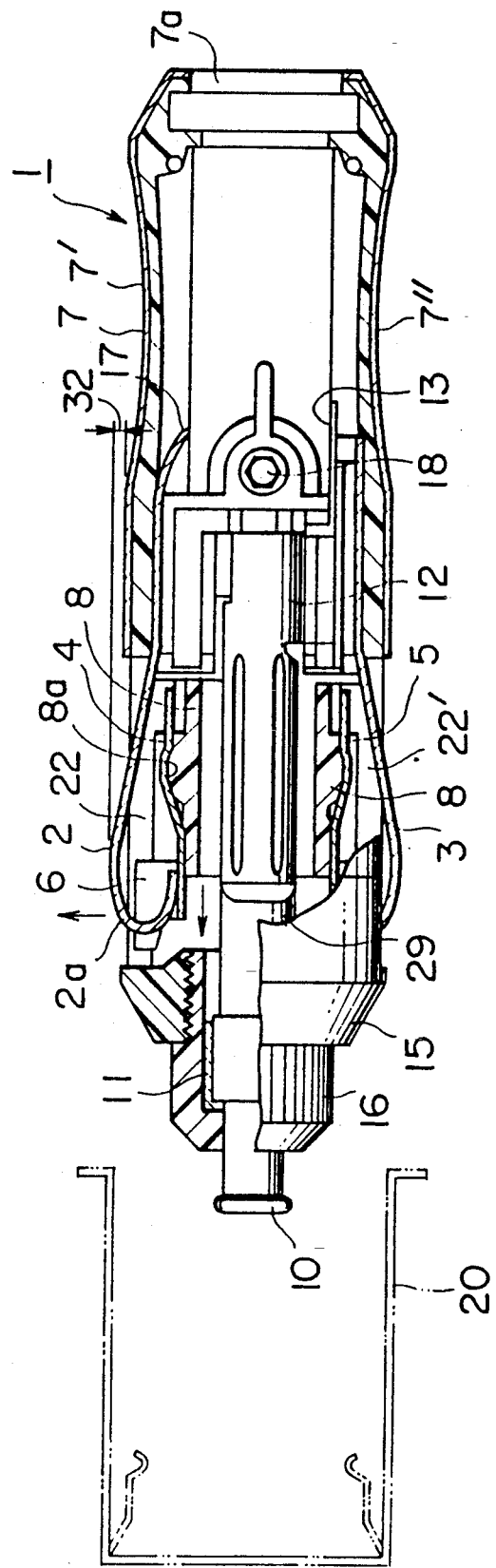
FIG. 2 is a perpendicular sectional view of the Plug of FIG. 1 adjusted to its small size position.

Referring now to FIG. 2, slider 8 is shown in its rearward, small size position. Grounding contact 2 and retention spring 3 are biased inward. A protrusion height 32 of grounding contact 2 and retention spring 3 is small at this adjustment. The inward bias of grounding contact 2 and retention spring 3 moves stoppers 6 inward within the periphery of tip 15. This permits plug 1 to slide into socket 20, where socket 20 is a small size socket.

Referring now to FIG. 1, slider 8 is moved to its forward, large size position. Grounding contact 2 and retention spring 3 are urged outward. The protrusion heights 32 of the springy ends 2a and 3a (FIG. 4) of grounding contact 2 and retention spring 3, respectively, is quite large at this adjustment. The protrusion height is so great that, if it is attempted to insert plug 1 into a small size socket, grounding contact 2 and retention spring 3 would be distorted. At this adjustment, stoppers 6 are urged outward so that they protrude beyond the periphery of tip 15.

Figure 5:
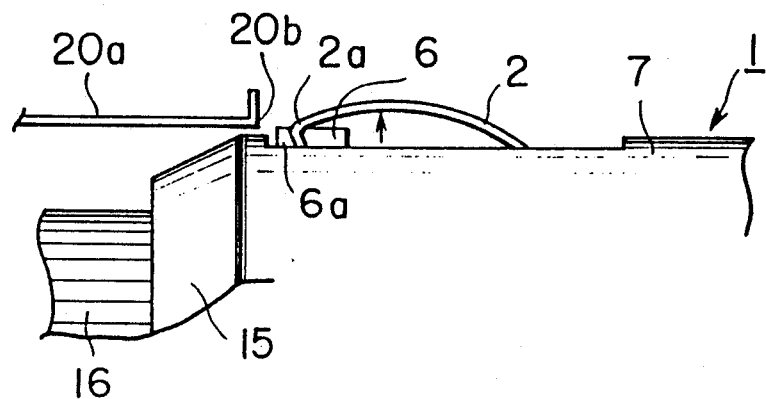
FIG. 5 is a partially enlarged drawing to which reference will be made in explaining the function of the stopper of FIGS. 1 and 2.

Referring now to FIG. 5, if an attempt is made to insert plug 1, adjusted to its large size position, into a small diameter socket 20a, stoppers 6 contact a socket inlet edge 20b of small diameter socket 20a, and prevent insertion of plug 1. This prevents mis-insertion of plug 1 and the consequent distortion of grounding contact 2 and retention spring 3. When insertion is prevented in this way, the user can adjust the plug 1 to its small size position, thereby permitting insertion into the small size socket 20. However, the Plug 1, adjusted to its large size position, fits into the large diameter socket 20 without having the outer edges of the stoppers hit the socket inlet edge.

Referring now to FIG. 4b, the size adjustment of the Plug 1 is performed by setting the adjustment knob 9 to the S (small size position) toward the rear end of the Plug 1 for fitting a small size socket, or by setting the adjustment knob 9 to the L (large size position) for fitting a large size socket.

Figure 6:
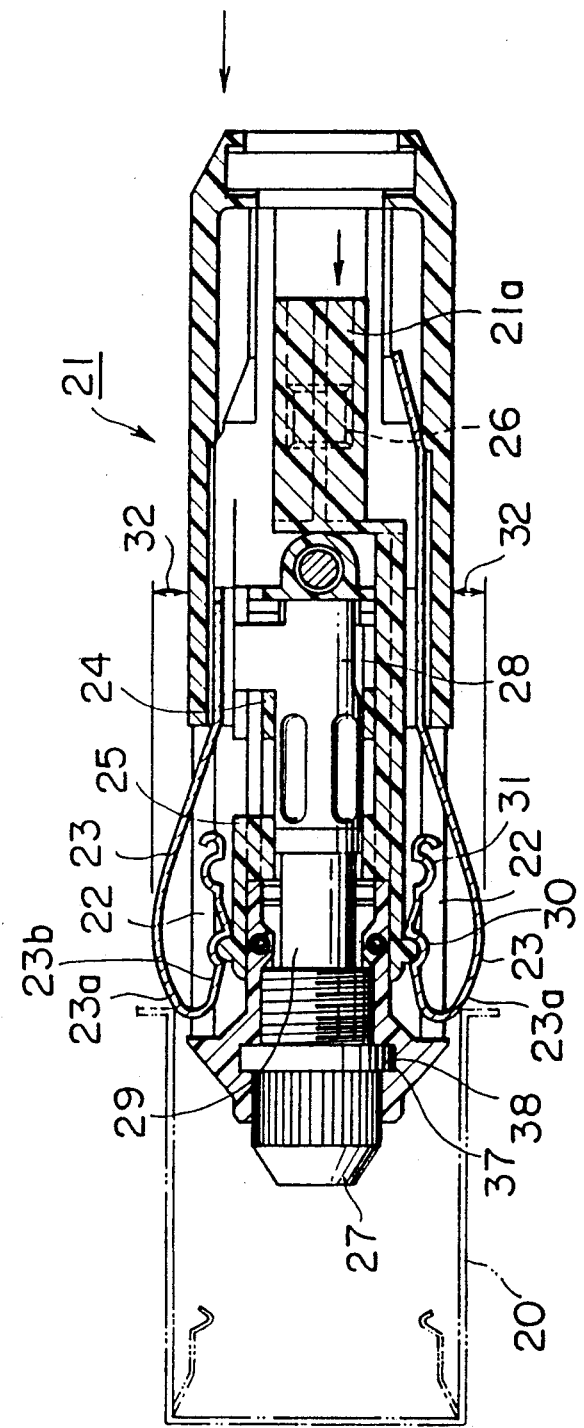
FIG. 6 is a longitudinal sectional view of the another embodiment of the Plug shown adjusted to its large size position.

Referring now to FIG. 6, a second preferred embodiment of the invention includes a Plug 21 without the sliding spring plates 4 and 5 of the embodiment of FIGS. 1 and 2. Only those elements differing in function from the embodiment of FIGS. 1 and 2 are described in detail. A positive contact element 27, which also serves as the cap, extends from forward end of the Plug 21 for contacting a positive electrode (not shown) in the Socket 20. A flange 37, integrally formed about the perimeter of the positive contact element 27, is fitted into an annular groove 38 for retaining positive contact element in place. A cartridge fuse 29 abuts the rear end of contact element 27 to provide electrical connection therewith.

Figure 8:
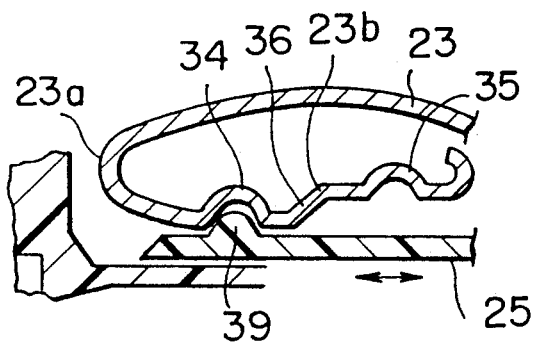
FIG. 8 is an enlarged cross section of the plug of FIG. 6

A springy end 23a of an arcuately bowed portion of a grounding contact 23 extends outward through openings 22 in plug 21. A rear end of grounding contact 23 is captured in Plug 21. A return portion 23b of grounding contact 23 rests against an outer surface of a slider 25. A forward dimple 34 is formed in a forward part of return portion 23b. A rear dimple 34 is formed in a rearward part of return portion 23b. An inclined portion 36 connects the forward and rear portions of return portion 23b. A boss 39 on slider 25 snaps into forward dimple 34 in the large size adjustment position illustrated in FIGS. 6 and 8. Due to the presence of inclined portion 36, slider 25 urges grounding contact outward in this adjustment position.

Figure 9:
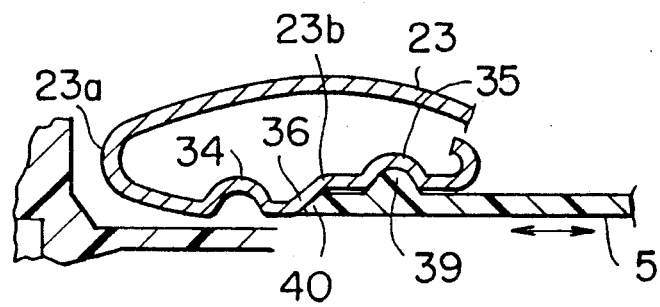
FIG. 9 is an enlarged cross section of the plug of FIG. 7.
Figure 7:
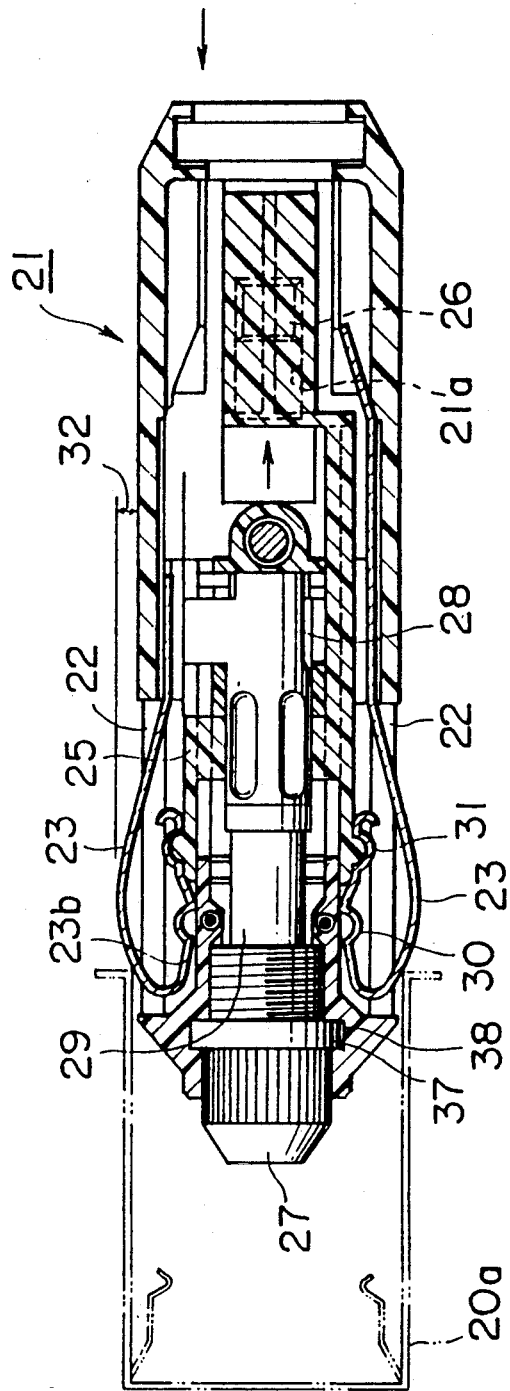
FIG. 7 is a longitudinal sectional view of the Plug of FIG. 6 adjusted to its small size position.

Referring now to FIGS. 7 and 9, plug 21 is shown in its small size adjustment position with slider 25 adjusted rearward to permit boss 39 to snap into dimple 35. A ramp portion 40 at a forward end of slider 25 has an incline generally the same as the incline of inclined portion 36 of return portion 23b. Ramp portion 40 assists in elevating grounding contact 23 as slider 25 is moved forward from its small size position shown in FIGS. 7 and 9 to its large size position shown in FIGS. 6 and 8.

Dimples 34 and 35 and boss 39 are shaped to provide snap-action sound and feel to alert the user to the completion of an adjustment between small and large sizes. The shapes of dimples 34 and 35, and the complementary shape of boss 39 may take any convenient form. In a preferred embodiment, dimples 34 and 35 are linear grooves formed across the width of return portion 23b, and boss 39 is a linear projection across slider 25. Alternatively, dimples 34 and 35 may have a generally conical, or hemispherical shape and boss 39 may have a shape that is complementary to them. In addition, although the figures illustrate the dimples located on return portion 23b and the boss on the slider 25, the locations of these elements may be reversed without departing from the spirit and scope of the invention.

An arcuately bowed retention spring 33 protrudes from the opposite side of the plug 21. Retention spring 33 has the same features as grounding contact, and the same interaction with slider 25. Therefore, further detailed description of the structure and function of retention spring 33 is considered unnecessary.

Referring now to FIGS. 6 and 7, an adjustment knob 26 (shown in dashed line) is integrally formed with slider 25. Adjustment knob 26 protrudes outward through a window (not shown) from plug 21 to make it accessible for adjustment of the position of slider 25.

It will be noted that the embodiment of the invention in FIGS. 6-9, although simpler than the embodiment in FIGS. 1 and 2, lacks the feature of a stopper for preventing insertion of plug 21, adjusted to its large size, into a small size socket.

Figure 10A:
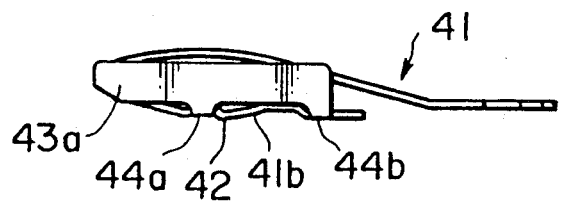
FIG. 10a is a side view of a contact or retention spring having an integral stopper.
Figure 10B:
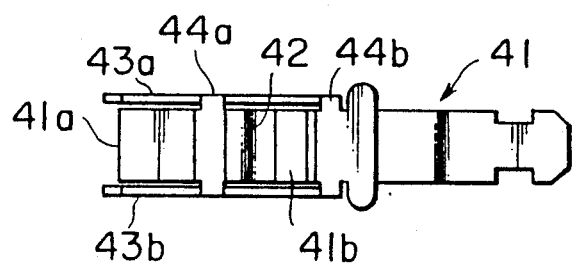

Referring now to FIGS. 10a and 10b, a grounding contact 41 is similar to grounding contact 23 of FIGS. 6 and 7, in that it has an arcuately shaped contact, a springy end 41a and a return portion 41b. A boss 42 projects downward from return portion 41b for snap interaction with dimples or grooves (not shown) on a cooperating slider (not shown). Stoppers 43a and 43b are integrally formed with return portion 41b, and are bent upward at two spaced-apart bends 44a and 44b to lie alongside springy end 41a. Grounding contact 41 is moved inward and outward by adjustment of the associated slider (not shown) between a large size position and a small size position. Stoppers 43a and 43b are positioned with respect to grounding contact 41 such that, if a large size adjustment is selected, and it is attempted to insert the plug into a small size socket, stoppers 43a and 43b contact a front surface of the socket and thus prevent insertion of the plug in the socket. This operation corresponds exactly to the function of the embodiment of FIGS. 1 and 2.

Stoppers 43a and 43b are made as long as possible to give them sufficient strength to avoid deformation if a forcible attempt is made to insert the associated plug, adjusted for large size, into a small size socket. The spacing between bends 44a and 44b adds stability to stoppers 43a and 43b.

The presence of stoppers 43a and 43b have an additional benefit. In the absence of stoppers 43a and 43b, application of a side force, tangential to the plug, on springy end 41a can deform grounding contact 41. The presence of stoppers 43a and 43b protects grounding contact 41 from deformation from such side force.

Grounding contact 41 may also be used as a retention spring without change is structure or function.

Figure 11A:
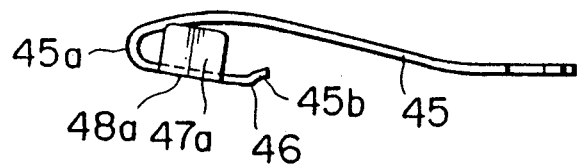
FIG. 11a is a side view of a contact or retention spring having a different integral stopper.
Figure 11B:
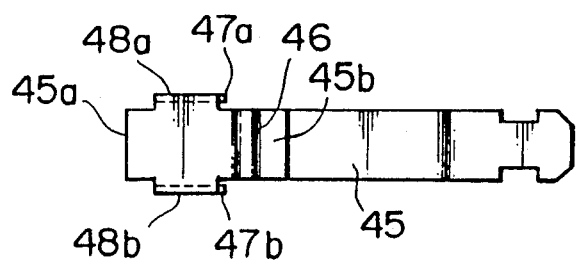

Referring now to FIGS. 11a and 11b, a grounding contact 45 is shown according to a further embodiment of the invention. An arcuate contact portion of grounding contact 45 is employed, as in prior embodiments, for providing a resilient contact with a socket (not shown). A springy end 45a connects the arcuate contact portion to a return portion 45b. A boss 46 interacts with a slider (not shown) as in the prior embodiment to move grounding contact outward into a large size position, or inward into a small size position. First and second stoppers 47a and 47b are integrally formed with grounding contact 45. It will be noted that stoppers 47a and 47b are attached at single bends 48a and 48b, respectively, in contrast to the two-place attachment of the stoppers in the embodiment of FIGS. 10a and 10b.

In the prior embodiments, an arcuate grounding contact has been illustrated and described in combination with a similar arcuate retention spring. Some applications may not require a retention spring, and a plug having a grounding contact, according to the above disclosure, but which omits a retention spring, should be considered to fall within the scope of the invention. In the same fashion, radial adjustment of both the grounding contact and retention spring may not be necessary. It is within the contemplation of the inventor that only one of these elements may be radially adjustable, while the remaining one remains stationary. In such an embodiment, sufficient retention force is generated by the one movable element, while the reduction in outside diameter resulting from moving the one movable element inward is sufficient to prevent distortion of the spring.

As the explained above, the Plug covered by the invention can be adjusted to have sufficient retentive power for a large diameter Socket on European-made cars by decreasing the distance between the outer surface of the grounding contact and the inner surface of the Socket by sliding the adjustment knob slide in a specified direction to increase the protrusion.

For small diameter Sockets e.g., U.S.-made cars, the adjustment knob is moved in the opposite direction to decrease the protrusion of the contact. This adjustability permits a Plug, according to the present invention, to be useable in any country in the world. Furthermore, sufficient retentive power is produced at both adjustment to attain a reliable electrical connection between a Plug and its cooperating Socket.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A cigar lighter plug for insertion into a socket comprising:
   a metallic member extending a predetermined distance radially from said cigar lighter plug for contacting an interior of said socket;
   means for adjusting said predetermined distance to at least first and second different values;
   said socket having at least first and second different interior diameters;
   said first diameter being smaller than said second diameter;
   said first value being adapted for contacting said first interior diameter; and
   said second value being adapted for contacting said second interior diameter.

2. A cigar lighter plug according to claim 1 wherein said metallic member is a contact.

3. A cigar lighter plug according to claim 1 wherein said metallic member is a retention spring.

4. A cigar lighter plug according to claim 1 wherein said metallic member includes:
   a contact on one side of said plug;
   a retention spring on a second side of said plug; and
   said means for adjusting being effective for moving both said contact and said retention spring between said first and second different values.

5. A cigar lighter plug according to claim 1, wherein said means for adjusting includes:
   a slider;
   means for permitting said slider to move between at least first and second longitudinal positions in said plug;
   cooperating means, effective when said slider is in said first longitudinal position, for moving said metallic member to said first value; and
   said cooperating means further including means, effective when said slider is in said second longitudinal position, for moving said metallic member to said second value.

6. A cigar lighter plug according to claim 5, wherein said cooperating means includes:
   an inclined portion on said metallic member;
   a first end of said inclined portion being at a different radial position than a second end of said inclined portion;
   said slider contacting said first end of said inclined portion when said slider is in said first position; and
   said slider contacting said second end of said inclined portion when said slider is in said second position, whereby said metallic member is moved to said first and second different values of said predetermined distance.

7. A cigar lighter plug according to claim 5, wherein said cooperating means includes:
   a boss on one of said slider and said contact;
   at least first and second depressions in the other of said slider and said contact;
   said boss entering said first depression when said slider is in said first longitudinal position; and
   said boss entering said second depression when said slider is in said second longitudinal position.

8. A cigar lighter plug according to claim 7, wherein cooperating means includes means effective upon entering of said boss into said first and second depressions to produces a click sound and feel, whereby a user is informed that an adjustment operation of said cigar lighter plug is completed.

9. A cigar lighter plug according to claim 7, wherein said cooperating means includes:
   said first depression being at a first radial position; and
   said second depression being at a second radial position different said first radial position, whereby said contact is extended said first value when said boss engages said first depression and is extended said second value when said boss engages said second depression.

* * * * *